United States Patent
Shoham et al.

(10) Patent No.: US 10,212,082 B2
(45) Date of Patent: Feb. 19, 2019

(54) DYNAMIC PRIORITY OF CONTENT-ADDRESSABLE MEMORY BLOCKS USED IN DETERMINING A HIGHEST-PRIORITY MATCHING ENTRY

(71) Applicant: Cisco Technology, Inc., San Jose, CA (US)

(72) Inventors: Doron Shoham, Shoham (IL); Sivan Avraham, Hadera (IL)

(73) Assignee: Cisco Technology, Inc., San Jose, CA (US)

( * ) Notice: Subject to any disclaimer, the term of this patent is extended or adjusted under 35 U.S.C. 154(b) by 101 days.

(21) Appl. No.: 15/640,523

(22) Filed: Jul. 1, 2017

(65) Prior Publication Data
US 2019/0007315 A1   Jan. 3, 2019

(51) Int. Cl.
*H04L 12/28* (2006.01)
*H04L 12/745* (2013.01)

(52) U.S. Cl.
CPC ................... *H04L 45/748* (2013.01)

(58) Field of Classification Search
CPC .................................................. H04L 45/748
USPC .......... 370/392–393, 395.4–395.43; 711/108
See application file for complete search history.

(56) References Cited

U.S. PATENT DOCUMENTS

| | | | |
|---|---|---|---|
| 6,374,326 B1 | 4/2002 | Kansal et al. | |
| 6,389,506 B1 | 5/2002 | Ross et al. | |
| 6,415,354 B1 * | 7/2002 | Joffe | G11C 15/00 711/108 |
| 6,526,474 B1 | 2/2003 | Ross | |
| 6,535,951 B1 | 3/2003 | Ross | |
| 6,606,681 B1 | 8/2003 | Uzun | |
| 6,700,809 B1 * | 3/2004 | Ng | G11C 15/00 365/236 |
| 6,715,029 B1 | 3/2004 | Trainin et al. | |

(Continued)

OTHER PUBLICATIONS

Bremler-Barr et al., PEDS: A Parallel Error Detection Scheme for TCAM Devices, IEEE/ACM Transaction on Networking, vol. 18, No. 5, Oct. 2010, IEEE, New York, New York (eleven pages).

*Primary Examiner* — Thai D Hoang
(74) *Attorney, Agent, or Firm* — The Law Office of Kirk D. Williams

(57) ABSTRACT

In one embodiment, packets are forwarded in a network based on lookup results in a content-addressable memory that includes multiple blocks of content-addressable memory entries, with the relative priority of these blocks typically determined on a per search basis. In one embodiment, the content-addressable memory blocks perform lookup operations based on a search key resulting in a lookup results. The result determiner determines an overall highest-priority content-addressable memory lookup result based on ordering the lookup results according to a dynamic priority ordering (e.g., retrieved from storage) among the content-addressable memory blocks. One embodiment allows multiple searches to occur simultaneously among the content-addressable memory blocks by selectively performing lookup operations on multiple search keys. One embodiment weights such lookup operations to initially assign search keys to content-addressable memory block(s) with a corresponding higher-priority, and if a match is found, other content-addressable memory block(s) will not need to be searched.

20 Claims, 7 Drawing Sheets

(56) References Cited

U.S. PATENT DOCUMENTS

| | | | |
|---|---|---|---|
| 6,738,862 B1 | 5/2004 | Ross et al. | |
| 6,871,262 B1 | 3/2005 | Oren et al. | |
| 6,944,709 B2 * | 9/2005 | Nataraj | G11C 15/00 711/108 |
| 7,028,136 B1 * | 4/2006 | Priyadarshan | G06F 17/30982 365/222 |
| 7,103,708 B2 | 9/2006 | Eatherton et al. | |
| 7,257,672 B2 | 8/2007 | Shoham et al. | |
| 7,260,673 B1 | 8/2007 | Ross | |
| 7,290,083 B2 | 10/2007 | Shoham et al. | |
| 7,305,519 B1 | 12/2007 | Nagaraj | |
| 7,345,897 B2 | 3/2008 | Krishnan et al. | |
| 7,349,230 B2 | 3/2008 | Parthasarathy et al. | |
| 7,350,131 B2 | 3/2008 | Trainin | |
| 7,382,637 B1 * | 6/2008 | Rathnavelu | G11C 15/00 365/189.05 |
| 7,516,119 B1 * | 4/2009 | Kao | G11C 15/00 |
| 7,924,839 B2 * | 4/2011 | Rajgopal | G06F 17/30985 370/392 |
| 8,887,026 B2 | 11/2014 | Bremler-Barr et al. | |
| 9,305,115 B1 * | 4/2016 | Estan | G06F 1/3275 |
| 2003/0093613 A1 * | 5/2003 | Sherman | G06F 17/30327 711/104 |
| 2004/0030802 A1 * | 2/2004 | Eatherton | G06F 17/30982 709/245 |
| 2004/0030803 A1 * | 2/2004 | Eatherton | G06F 17/30982 709/245 |
| 2004/0109451 A1 * | 6/2004 | Huang | H04L 45/54 370/392 |
| 2004/0170171 A1 * | 9/2004 | Kanekar | G06F 17/30982 370/392 |
| 2004/0170172 A1 * | 9/2004 | Pullela | G06F 17/30982 370/392 |
| 2004/0172346 A1 * | 9/2004 | Kanekar | G06F 17/30982 705/30 |
| 2007/0028039 A1 * | 2/2007 | Gupta | G11C 15/00 711/108 |
| 2011/0161580 A1 * | 6/2011 | Shah | H04L 49/10 711/108 |
| 2011/0276752 A1 * | 11/2011 | Kishore | H04L 45/7457 711/108 |

* cited by examiner

DYNAMIC PRIORITY OF CONTENT-ADDRESSABLE MEMORY BLOCKS USED IN DETERMINING A HIGHEST-PRIORITY MATCHING ENTRY

TECHNICAL FIELD

The present disclosure relates generally forwarding packets in a network based on lookup results (e.g., longest prefix matching) in a content-addressable memory (e.g., a binary or ternary content-addressable memory) that includes multiple blocks of content-addressable memory entries with the priority among these multiple blocks typically determined on a per search basis.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Content-addressable memories (e.g., binary and ternary content-addressable memories) are particularly useful in performing lookup operations in determining how to forward a packet in a network by a packet switching device.

BRIEF DESCRIPTION OF THE DRAWINGS

The appended claims set forth the features of one or more embodiments with particularity. The embodiment(s), together with its advantages, may be understood from the following detailed description taken in conjunction with the accompanying drawings of which:

DESCRIPTION OF EXAMPLE EMBODIMENTS

1. Overview

Figure 1A:
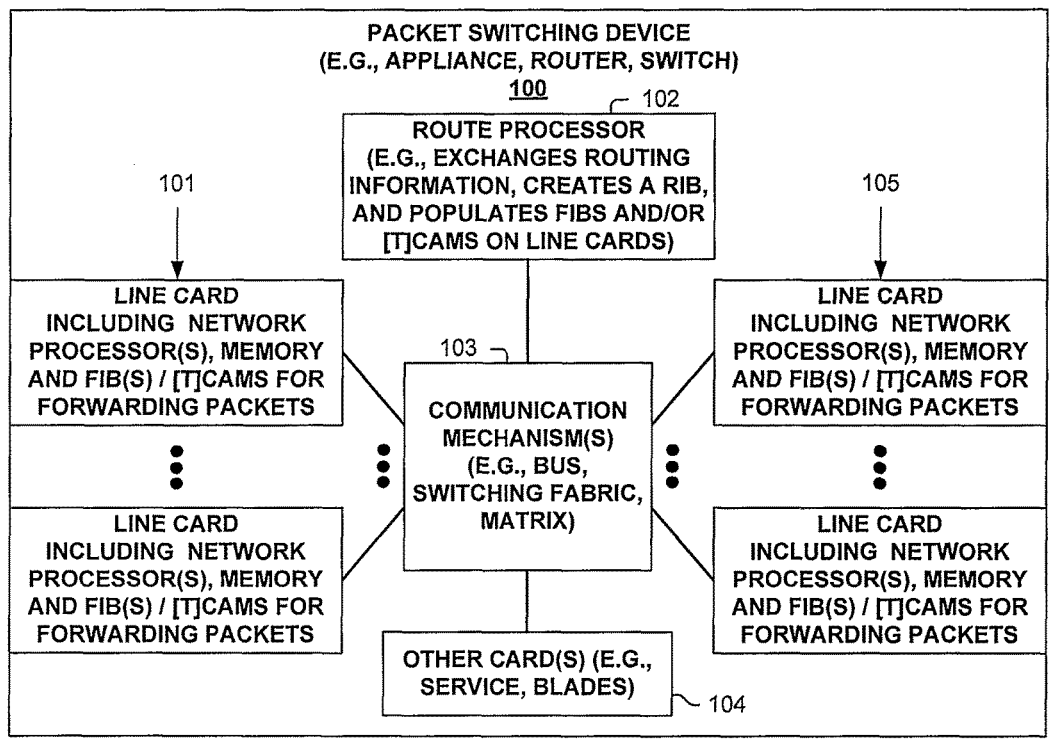
FIG. 1A illustrates a packet switching device including a content-addressable memory with dynamic priority of its content-addressable memory blocks according to one embodiment.

Disclosed are, inter alia, methods, apparatus, computer-storage media, mechanisms, and means associated with dynamic priority of content-addressable memory blocks used in determining a highest-priority matching entry, such as, but not limited to, in performing a longest prefix match operation in determining how to forward a packet in a network.

One embodiment includes an apparatus, including multiple content-addressable memory blocks and a result determiner. The content-addressable memory blocks perform lookup operations based on a search key resulting in a lookup results including corresponding one or more lookup results for each of the content-addressable memory blocks. The result determiner determines an overall highest-priority content-addressable memory lookup result based on ordering the lookup results according to a dynamic priority ordering (e.g., retrieved from storage) among the content-addressable memory blocks. One embodiment allows multiple searches to occur simultaneously among the content-addressable memory blocks by selectively performing lookup operations on multiple search keys. One embodiment weights such lookup operations to initially assign search keys to content-addressable memory block(s) with a corresponding higher-priority, as if a match is found, other content-addressable memory block(s) will not need to be searched.

2. Description

Disclosed are, inter alia, methods, apparatus, computer-storage media, mechanisms, and means associated with dynamic priority of content-addressable memory blocks used in determining a highest-priority matching entry, such as, but not limited to, in performing a longest prefix match operation in determining how to forward a packet in a network. As used herein a content-addressable memory block refers to one or more content-addressable banks of entries.

Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC § 101 machine statutory class.

Figure 1B:
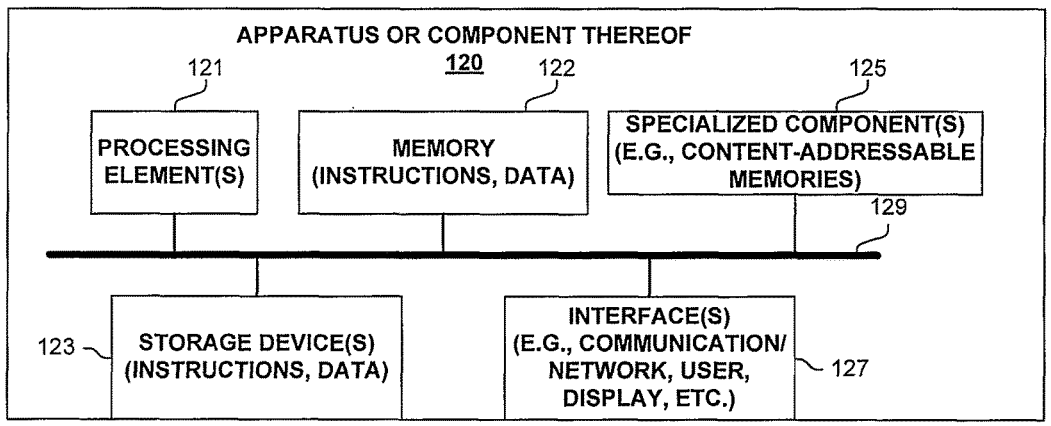
FIG. 1B illustrates an apparatus including a content-addressable memory with dynamic priority of its content-addressable memory blocks according to one embodiment.

FIGS. 1A-B and their discussion herein are intended to provide a description of various exemplary packet switching systems used according to one embodiment that searches varying selectable physical content-addressable memory blocks of entries within a content-addressable memory with dynamic assignment of priorities among the blocks (e.g., on a per search or profile basis), such as, but not limited to, in performing a longest prefix match operation in determining how to forward a packet in a network.

One embodiment of a packet switching device 100 is illustrated in FIG. 1A. As shown, packet switching device 100 includes multiple line cards 101 and 105, each with one or more network interfaces for sending and receiving packets over communications links (e.g., possibly part of a link aggregation group), and with one or more processing elements that are used in one embodiment associated with dynamic priority of content-addressable memory blocks used in determining a highest-priority matching entry, such as, but not limited to, in performing a longest prefix match operation in determining how to forward a packet in a network. Packet switching device 100 also has a control plane with one or more processing elements 102 for managing the control plane and/or control plane processing of packets associated with dynamic priority of content-addressable memory blocks used in determining a highest-priority matching entry, such as, but not limited to, in performing a longest prefix match operation in determining how to forward a packet in a network. Packet switching device 100 also includes other cards 104 (e.g., service cards, blades) which include processing elements that are used in one embodiment to process (e.g., forward, drop, manipulate) packets associated with dynamic priority of content-addressable memory blocks used in determining a highest-priority matching entry, such as, but not limited to, in performing a longest prefix match operation in determining how to forward a packet in a network, and some communication mechanism 103 (e.g., bus, switching fabric, and/or matrix, etc.) for allowing its different entities 101, 102, 104 and 105 to communicate.

Line cards 101 and 105 typically perform the actions of being both an ingress and egress line card, in regards to multiple other particular packets and/or packet streams being received by, or sent from, packet switching device 100. In one embodiment, network processors on line cards 101 and/or 105 use a content-addressable memory with varying selectable physical blocks of entries to determine packet forwarding information (e.g., based on a lookup operation of a destination address, label or some other value) in a forwarding information base (FIB), and forward (or process in a different manner) the packet accordingly.

FIG. 1B is a block diagram of an apparatus 120 used in one embodiment associated with dynamic priority of content-addressable memory blocks used in determining a highest-priority matching entry, such as, but not limited to, in performing a longest prefix match operation in determining how to forward a packet in a network. In one embodiment, apparatus 120 performs one or more processes, or portions thereof, corresponding to one of the flow diagrams illustrated or otherwise described herein, and/or illustrated in another diagram or otherwise described herein.

In one embodiment, apparatus 120 includes one or more processor(s) 121 (typically with on-chip memory), memory 122, storage device(s) 123, specialized component(s) 125 (e.g. optimized hardware such as for performing lookup and/or packet processing operations, performing multiple lookup and/or other operations in parallel, such as, but not limited to using content-addressable memory with varying selectable physical blocks of entries, etc.), and interface(s) 127 for communicating information (e.g., sending and receiving packets, user-interfaces, displaying information, etc.), which are typically communicatively coupled via one or more communications mechanisms 129 (e.g., bus, links, switching fabric, matrix), with the communications paths typically tailored to meet the needs of a particular application.

Various embodiments of apparatus 120 may include more or fewer elements. The operation of apparatus 120 is typically controlled by processor(s) 121 using memory 122 and storage device(s) 123 to perform one or more tasks or processes. Memory 122 is one type of computer-readable/computer-storage medium, and typically comprises random access memory (RAM), read only memory (ROM), flash memory, integrated circuits, and/or other memory components. Memory 122 typically stores computer-executable instructions to be executed by processor(s) 121 and/or data which is manipulated by processor(s) 121 for implementing functionality in accordance with an embodiment. Storage device(s) 123 are another type of computer-readable medium, and typically comprise solid state storage media, disk drives, diskettes, networked services, tape drives, and other storage devices. Storage device(s) 123 typically store computer-executable instructions to be executed by processor(s) 121 and/or data which is manipulated by processor(s) 121 for implementing functionality in accordance with an embodiment.

In one embodiment, the power consumed and heat generated by a content-addressable memory lookup operation is a function of the number of content-addressable memory entries searched. By partitioning these content-addressable memory entries into content-addressable memory blocks, only designated blocks are searched for a given search key. By programming related possible matching content-addressable memory entries into same particular blocks, only those particular relevant blocks need to be searched thus reducing the power consumed and heat generated.

Further, one embodiment programs related possible matching content-addressable memory entries into particular blocks in a manner such that for each given entry X, there is no lower-priority possible matching entry than X programmed in a higher-priority content-addressable memory block. Therefore, if a match is found, no other lower-priority bank needs to be searched as it cannot produce a higher-priority matching entry. Within each content-addressable memory entries are typically programmed (for performing longest prefix matching) in a manner such that each longer possible matching entry is programmed in a higher-priority position relative to each shorter possible matching entry.

Further, one embodiment dynamically assigns the priority order of relevant content-addressable memory banks on a per search or per profile basis. Thus, the lookup operations for two different search keys can have different priorities assigned to the same content-addressable memory blocks, as well as different sets of relevant content-addressable memory blocks to be searched. One embodiment weights lookup operations to first search one or more of the dynamically assigned highest-priority blocks. If a match is then found the other block(s) are not searched. If no match is found, other block(s) are searched. Also, when the set of banks to be currently searched for multiple different search keys do not overlap (e.g., there is no same block), then these multiple searches can be done in parallel (e.g., overlapping in time). The dynamic priority assignment of content-addressable memory blocks allows entries to be programmed to enhance the ability to perform multiple lookup operations simultaneously, as for example, a higher-priority block for a first search key or first search profile may be a lower-priority block for a second search key or second search profile.

Figure 2A:
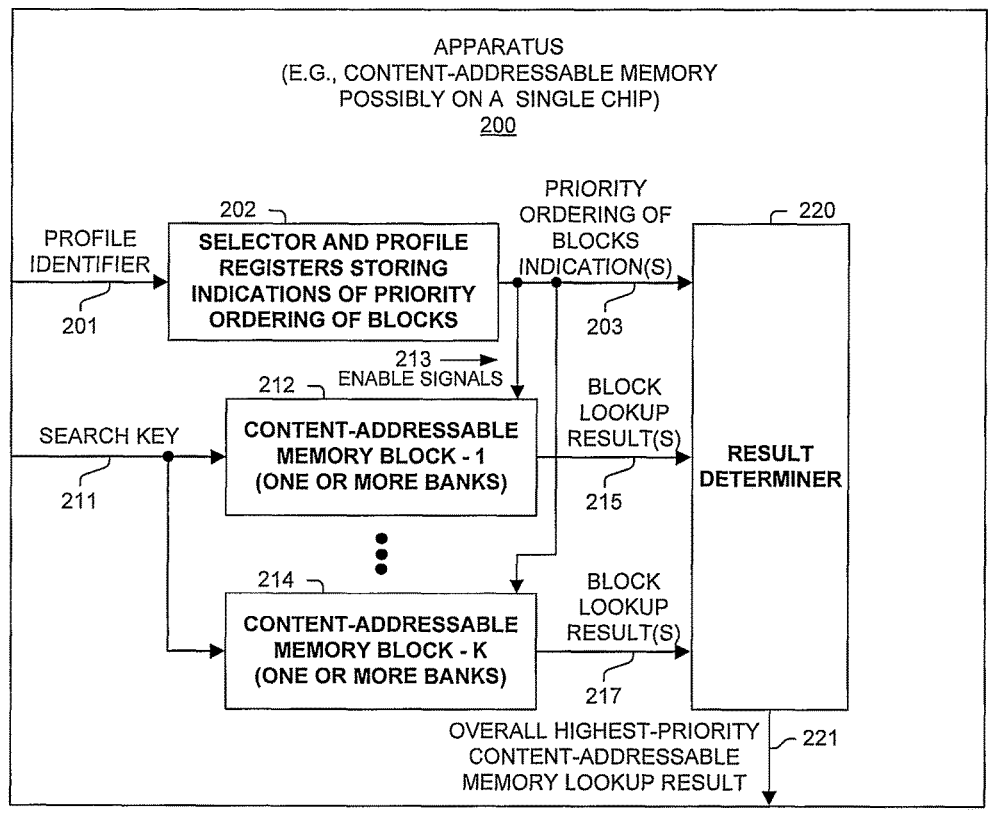
FIG. 2A illustrates an apparatus including a content-addressable memory with dynamic priority of its content-addressable memory blocks according to one embodiment.

FIG. 2A illustrates an apparatus 200 including a content-addressable memory with dynamic priority of its multiple content-addressable memory blocks 212-214 according to one embodiment, possibly embodied on a single chip. As shown, apparatus 200 includes a selector and profile registers 202 that store various indications of different priority orderings of content-addressable memory blocks on a per profile identifier basis.

In one embodiment, when a search is to be performed, a profile identifier 201 and search key 211 is provided to the content-addressable memory 200. Profile identifier 201 is used to select from storage (202) (e.g., multiple registers) a corresponding block priority ordering indications 203 which is provided to result determiner 220 for use in determining a highest-priority matching result according to the specified block priority ordering. In one embodiment, these block priority ordering indications 203 are also provided as enable signals 213 to content-addressable memory blocks 212-214 so that only content-addressable memory blocks 212-214 that could result in match (e.g., a have search priority associated therewith) would be enabled and searched as block priority ordering indications 203 can identify one, multiple, all, or less than all of the content-addressable memory blocks 212-214.

Search key 211 is provided to content-addressable memory blocks 212-214, and each of the enabled content-addressable memory blocks 212-214 generates results 215-217, each of these results 215-217 may include a no match found signal, the identification of all matching entries in a block 212-214, and/or the identification of a highest-priority matching entry within a block 212-214.

Result determined 220 receives block priority ordering indications 203 and block lookup results 215-217, based on which, result determiner 220 signals the overall highest-priority content-addressable memory lookup result 221.

Figure 2B:
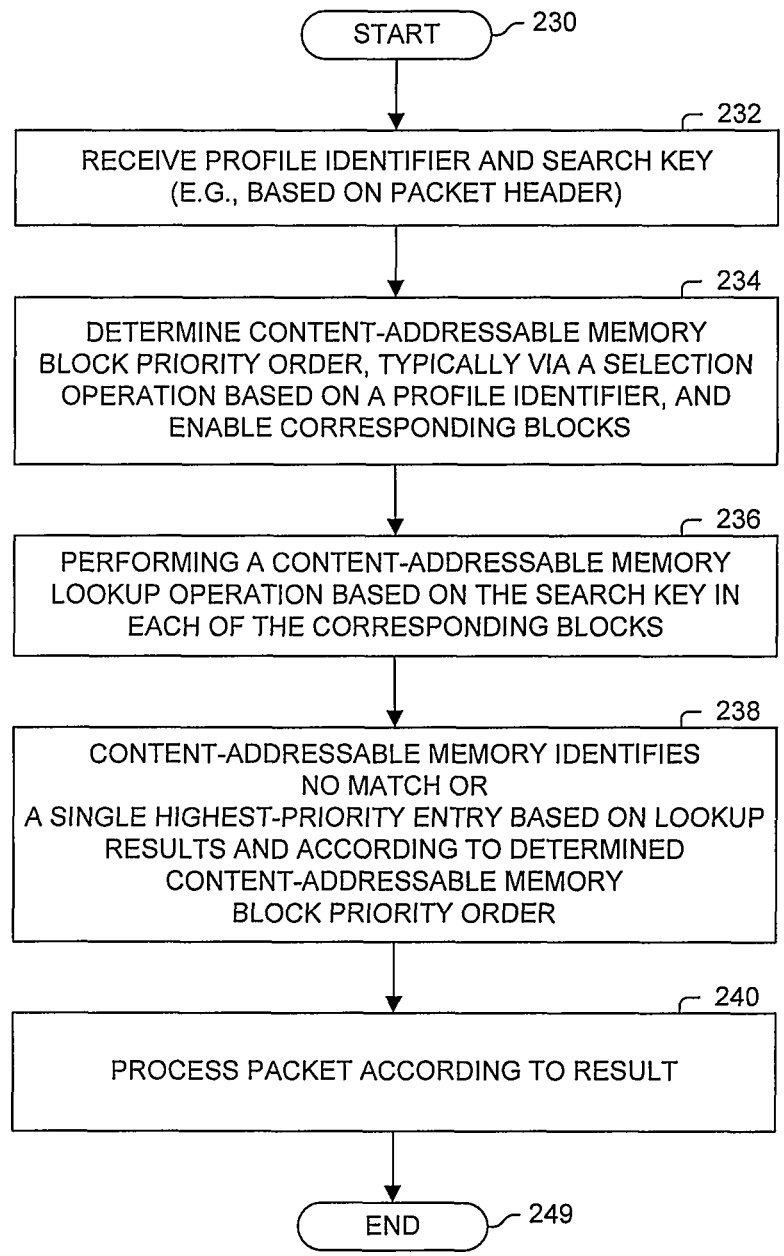
FIG. 2B illustrates a process according to one embodiment.

FIG. 2B illustrates a process according to one embodiment. Processing begins with process block 230. In process block 232, a profile identifier and search key (e.g. derived based on a packet header) are received by a content-addressable memory. In process block 234, the content-addressable memory block priority order is determined, such as, but not limited to, via a selection operation based on a profile identifier. Blocks included in the block priority order are typically enabled, while others are not for this particular lookup operation. In process block 236, a content-addressable memory lookup operation in performed based on the search key in each of the enabled blocks. In process block 238, the content-addressable memory identifies no match, or a single highest-priority entry based on lookup results and according to determined content-addressable memory block priority order. In process block 240, the packet is processed (e.g., forwarded, dropped, otherwise manipulated) according to the result. Processing of the flow diagram of FIG. 2B is complete as indicated by process block 249.

Figure 3:
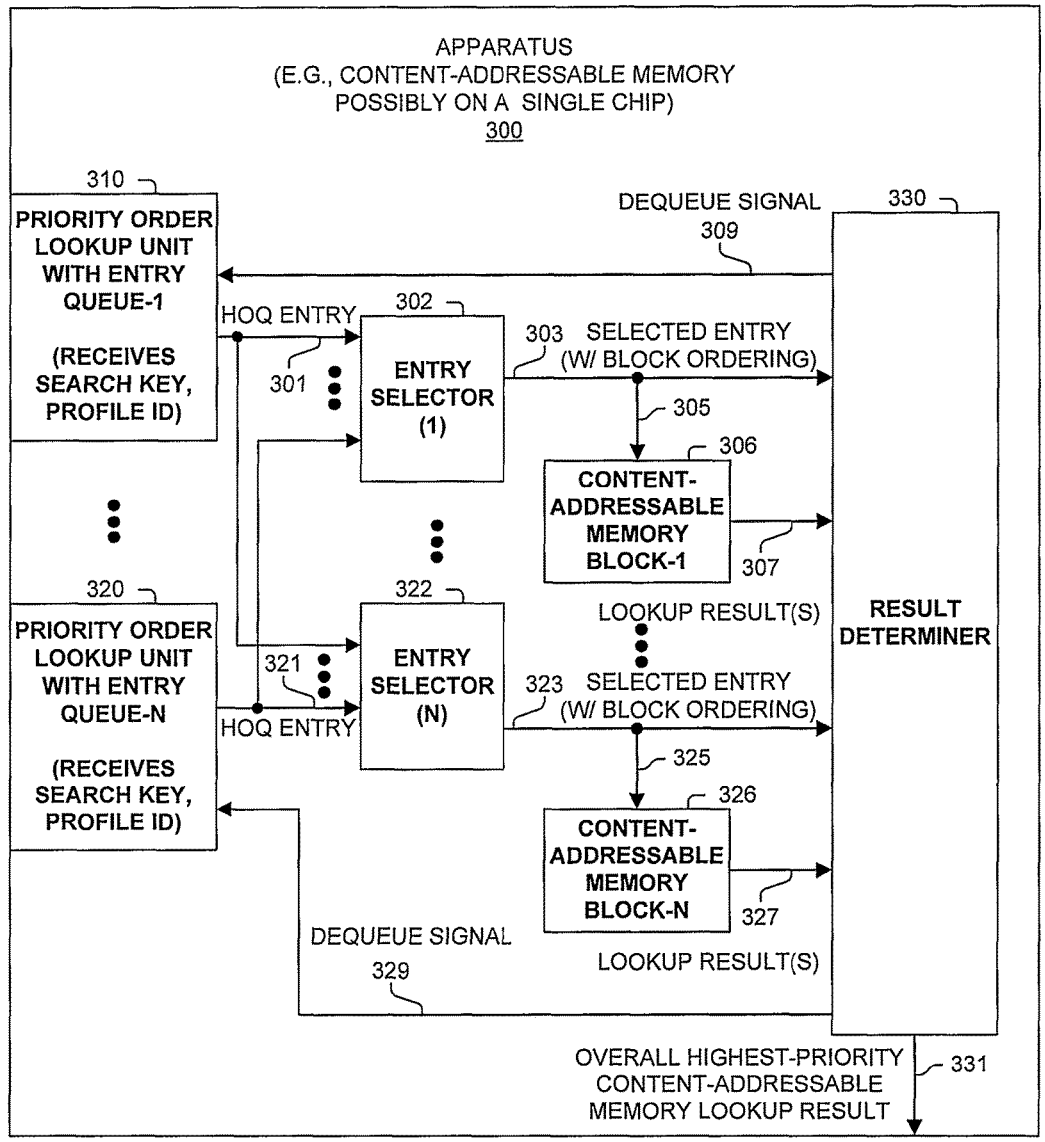
FIG. 3 illustrates an apparatus including a content-addressable memory with dynamic priority of its content-addressable memory blocks according to one embodiment.

FIG. 3 illustrates an apparatus 300 including a content-addressable memory with dynamic priority of its multiple content-addressable memory blocks 306, 326 according to one embodiment, possibly embodied on a single chip. The use of the ellipsis in any of the figures is used to convey that there may be more than two entities.

As shown, apparatus 300 includes a selector, profile registers, and entry queues 310, 320 that store various indications of different priority orderings of content-addressable memory blocks on a per profile identifier basis as well as queue up search key entries. In one embodiment, each of priority order lookup units with entry queues 310, 320 receives a search key and a profile identifier. The block priority ordering is retrieved from storage based on the profile identifier. An entry is placed at the end of the queue (with a queue being used herein as having one or more entries). In one embodiment, an entry consists of, or comprises the received search key and the retrieved block priority ordering. In one embodiment, each of entry queues 310, 320 is associated with a default profile identifier and/or block priority ordering which reduces or eliminates the need to receive the profile identifier and/or determining the block priority ordering on a per search key basis. In one embodiment, a block priority ordering is not determined by priority lookup unit 310, 320; rather the profile identifier is included in the entry for downstream entities to determine the block priority ordering. However, including the block priority ordering in the entry relieves downstream entities from having to determine it, which may be a more efficient one embodiment as it may reduce the overall number of operations performed. In one embodiment, the block priority ordering includes an indication of less than all of the content-addressable memory blocks 305, 326, as less than all content-addressable memory blocks 306, 326 are "relevant" for performing a corresponding search. In other words, the search space for that block priority ordering does not include all content-addressable memory blocks 306, 326 so they are not searched for a particular profile identifier and/or search key.

As shown in FIG. 3, each of entry selectors 302, 322 receive each entry 301, 321 at the head of their respective queues 310, 320. Each entry selector 302, 322 selects an entry (e.g., search key, priority ordering) and forwards to a respective content-addressable memory block 306, 326, and to result determiner 330.

Each of content-addressable memory blocks 306, 326 perform content-addressable memory lookup operations based on the respective search key (and possibly profile identifier) 305, 325 from entries 303, 323, and provide the corresponding lookup results 307, 327 to result determiner 330.

Result determiner 330 receives the lookup results 307, 327 as well as entries 303, 323 which include the block priority ordering defining the relevant content-addressable memory blocks 306, 326 and their relative priority ordering. Result determiner 330 correlates the lookup results for an entry 303, 323 and if a final lookup result has been determined (e.g., a match with no higher-priority relevant blocks to search, all relevant blocks searched with no matching entry found), then result determiner 330 provides the overall highest-priority content-addressable memory lookup result 331. Result determiner 330 also causes the corresponding entry to be removed from the head of a queue 310, 320 by providing a corresponding dequeue signal 309, 329. In one embodiment, a queue 310, 320 automatically removes an entry from the head of a queue 310, 320 in response to that entry being provided to all relevant content-addressable memory blocks 306, 326.

Figure 4A:
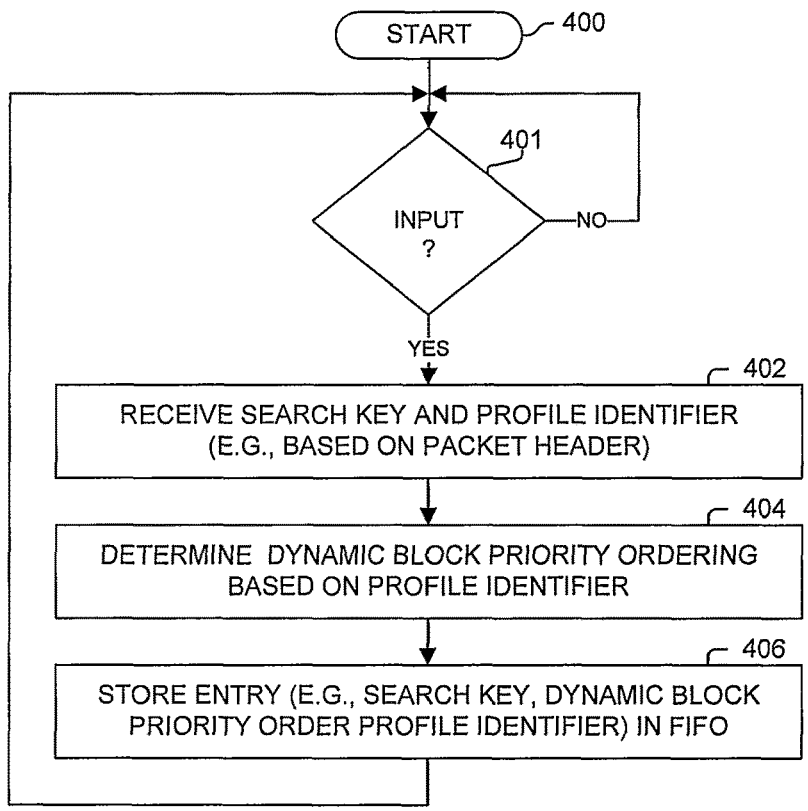
FIG. 4A illustrates a process according to one embodiment.

FIG. 4A illustrates a process according to one embodiment, such as, but not limited to, by a priority lookup unit with entry queue. Processing begins with process block 400. Processing waits at process block 401 until an input is received by the apparatus. In process block 402, a profile identifier and search key (e.g. derived based on a packet header) are received by the apparatus. In process block 404, the dynamic block priority ordering is determined (e.g., decoding the value, performing a retrieval from storage) based on the profile identifier. In one embodiment, the profile identifier and/or priority ordering is inherent to the receiving entity within the apparatus (e.g., pre-assigned). In process block 406, the entry is stored in a queue (with a queue being able to store one or more entries as used herein), with the entry including the search key and priority ordering. In one embodiment, an entry includes the profile identifier and search key, but not the priority ordering which is instead (or in addition) determined by result determiner. Processing returns to process block 401 to wait for future input.

Figure 4B:
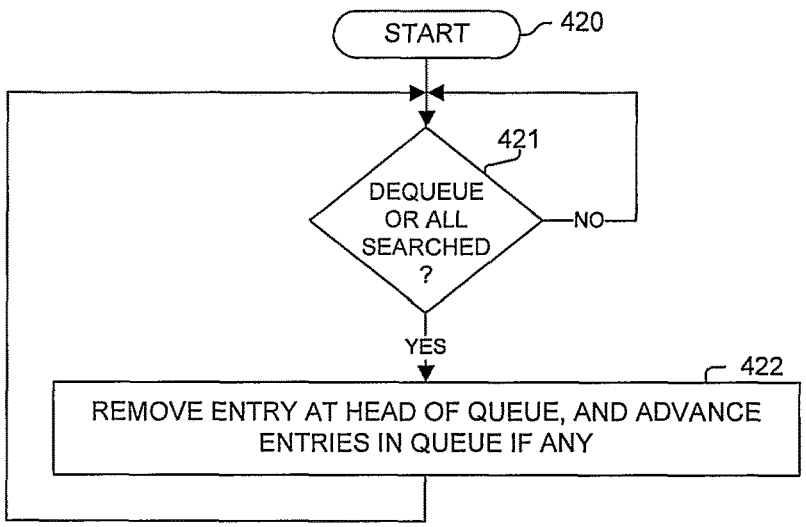
FIG. 4B illustrates a process according to one embodiment.

FIG. 4B illustrates a process according to one embodiment, such as, but not limited to by a queue storing entries. Processing begins with process block 420. In one embodiment, processing waits at process block 421 until a dequeue signal is received. In one embodiment, processing waits at process block 421 until a dequeue signal is received or automatically by the queue itself in response to the entry at the head of the queue having been provided for searching by all content-addressable memories (thus, there is no more search to be performed on that entry). In response to receiving the dequeue signal, the entry at the head of the corresponding queue is removed and any entries are advanced resulting in a different entry at the head of a non-empty queue in process block 422. Processing returns to process block 421 to wait for a dequeue signal.

Figure 5:
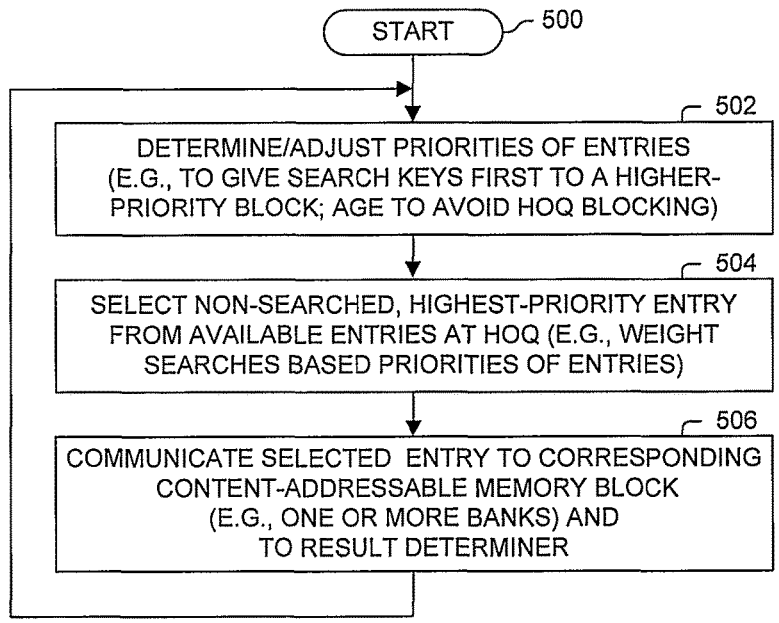
FIG. 5 illustrates a process according to one embodiment.

FIG. 5 illustrates a process according to one embodiment, such as, but not limited to, by an entry selector. Processing begins with process block 500. In process block 502, the priorities are determined/adjusted for each entry at the head of a connected queue. In one embodiment, this determination/adjustment weights search keys first to a higher-priority block, while aging (over time or in result to an event) an entry to increase its priority to avoid head of queue blocking. In process block 504, a non-searched, highest-priority entry is selected from available entries at the head of their respective queues. In process block 506, the selected entry is communicated to the corresponding content-addressable memory block (e.g., one or more banks) and to result determiner (so it can later correlate the search key and priority ordering with received lookup results). Processing returns to process block 502 to perform a next iteration of the flow diagram of FIG. 5.

Figure 6:
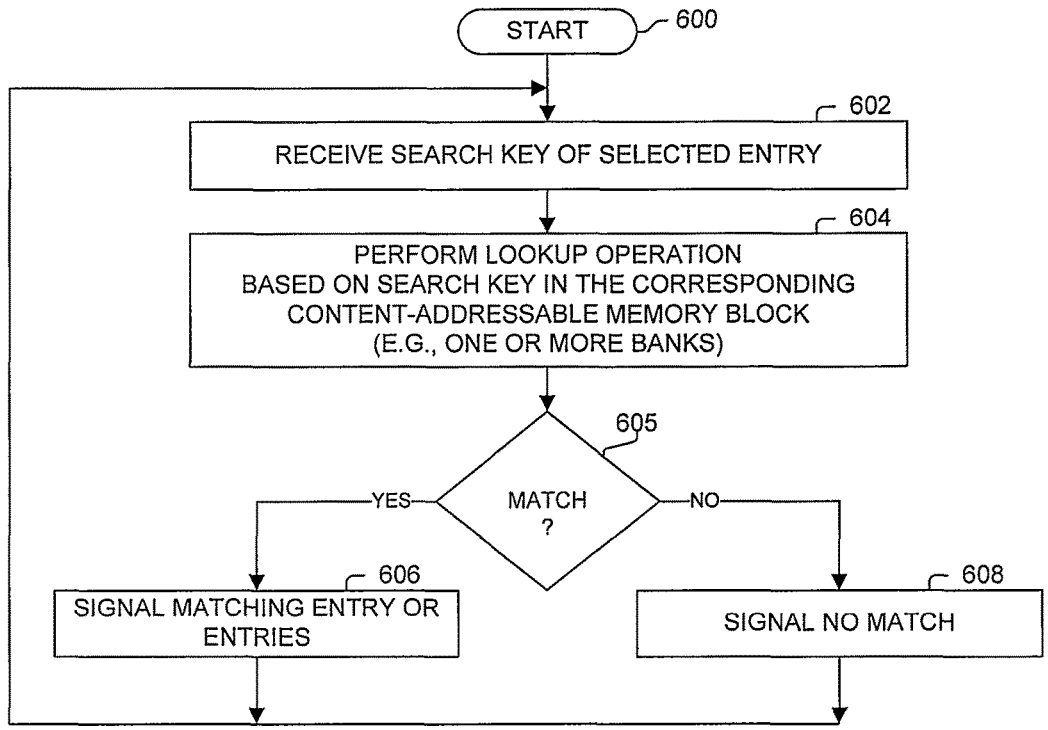
FIG. 6 illustrates a process according to one embodiment.

FIG. 6 illustrates a process according to one embodiment, such as, but not limited to, by a content-addressable memory block of one or more banks each with a plurality of content-addressable memory entries. Processing begins with process block 600. In process block 602, the search key of the selected entry is received. In process block 604, a lookup operation is performed based on the search key in the corresponding content-addressable memory block (e.g., one or more banks). As determined in process block 605, if a searched content-addressable memory entry matches the search key, then processing proceeds to process block 606 wherein the result is signaled; else processing proceeds to process block 608 to provide a no-match indication. Processing returns to process block 602 to perform a next search.

Figure 7:
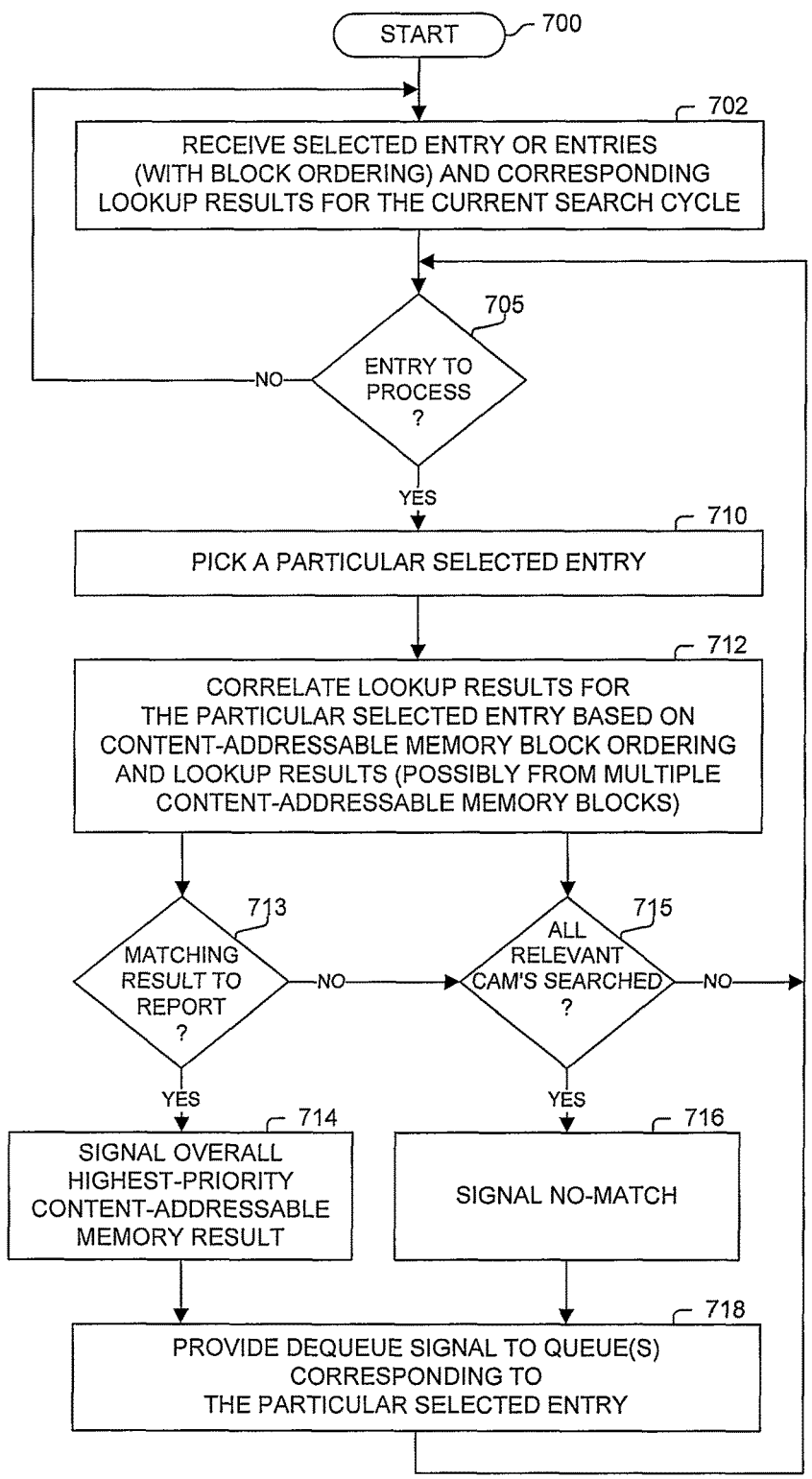
FIG. 7 illustrates a process according to one embodiment.

FIG. 7 illustrates a process according to one embodiment, such as, but not limited to, by a result determiner. Processing begins with process block 700. In process block 702, one or more selected entries (including the block priority ordering) and corresponding lookup results are received for the current search cycle (e.g., searching by one or more content-addressable memories typically overlapping in time).

As determined in process block 705, if there is an entry to be processed by the result determiner, then processing proceeds to process block 710; else processing returns to process block 702 to receive additional entries and search results from the next search cycle.

Proceeding to process block 710, a particular selected entry (e.g., tuple of search key, block priority ordering) is picked for current processing. In one embodiment, the particular selected entry was searched by one or multiple content-addressable memories during the current search cycle, will all of these results to be correlated. In process block 712, the lookup result(s) for the particular selected entry are correlated based on content-addressable memory block ordering and lookup results (possibly from multiple content-addressable memory blocks and prior searches).

As determined in process block 713, if there is a matching result to report (e.g., a match is found and there is no higher-priority relevant block—which includes all relevant content-addressable memory blocks being searched), then processing proceeds to process block 714; else no match has been found yet and processing proceeds to process block 715.

As determined in process block 715, if all relevant blocks have been searched, then processing proceeds to process block 716; else processing returns to process block 705 to process another entry or to receive additional entries and search results from the next search cycle (in process block 702).

In process block 714, the overall highest-priority content-addressable memory result based on received matching indications and the block priority ordering is signaled. In process block 718, a dequeue signal is proved to the queue(s) corresponding to the particular selected entry to remove it from the head of the queue(s). Processing returns to process block 705 to process another entry or to receive additional entries and search results from the next search cycle (in process block 702).

In process block 716, the result of no-matching entry found is signaled as all relevant content-addressable memory blocks of entries have been searched and no matching entry was determined. In process block 718, a dequeue signal is proved to the queue(s) corresponding to the particular selected entry to remove it from the head of the queue(s). Processing returns to process block 705 to process another entry or to receive additional entries and search results from the next search cycle (in process block 702).

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:
    performing a first content-addressable memory lookup operation in each particular content-addressable memory block of a first plurality of content-addressable memory blocks within a content-addressable memory based on a first search key resulting in a plurality of first one or more lookup results including corresponding one or more first lookup results for each said particular content-addressable memory block;
    retrieving from storage one or more first content-addressable memory block priority indications defining a first priority ordering among the first plurality of content-addressable memory blocks; and
    determining a first overall highest-priority content-addressable memory lookup result based on ordering the plurality of one or more first lookup results according to the first priority ordering among the first plurality of content-addressable memory blocks.

2. The method of claim 1, comprising receiving a first profile identifier by the content-addressable memory;
    wherein said retrieving from storage one or more first priority indications is performed based on the first profile identifier directly or indirectly identifying a location within said storage of said one or more first content-addressable memory block priority indications.

3. The method of claim 1, wherein a distinct content-addressable memory block of the first plurality of content-addressable memory blocks includes a plurality of content-addressable memory banks; and
    wherein said one or more first lookup results for the specific content-addressable memory block is a plurality of matching results with at least one matching result in each of the plurality of content-addressable memory banks.

4. The method of claim 1, wherein a specific content-addressable memory block of the first plurality of content-addressable memory blocks includes a plurality of content-addressable memory banks; and
    wherein said one or more first lookup results for the specific content-addressable memory block is a single highest-priority bank lookup result of at least one matching result in each of the plurality of content-addressable memory banks.

5. The method of claim 1, comprising:
    performing a second content-addressable memory lookup operation in each specific content-addressable memory block of the first plurality of content-addressable memory blocks based on a second search key resulting in a plurality of second one or more lookup results including corresponding one or more second lookup results for each said specific content-addressable memory block;
    retrieving from storage one or more second content-addressable memory block priority indications defining a second priority ordering among the first plurality of content-addressable memory blocks; and
    determining a second overall highest-priority content-addressable memory lookup result based on ordering the plurality of one or more second lookup results according to the second priority ordering among the first plurality of content-addressable memory blocks;
    wherein the first priority ordering and second priority ordering are different priority orderings among the first plurality of content-addressable memory blocks.

6. The method of claim 5, wherein the first plurality of content-addressable memory blocks include a first one or more content-addressable memory blocks non-overlapping with a second one or more content-addressable memory blocks;
    wherein the first content-addressable memory lookup operation in the first one or more content-addressable memory blocks is performed before the second content-addressable memory lookup operation in the first one or more content-addressable memory blocks; and
    wherein the second content-addressable memory lookup operation in the second one or more content-addressable memory blocks is performed before the first content-addressable memory lookup operation in the second one or more content-addressable memory blocks.

7. The method of claim 6, wherein the first content-addressable memory lookup operation in the first one or more content-addressable memory blocks and the second content-addressable memory lookup operation in the second one or more content-addressable memory blocks are performed overlapping in time; and
    wherein the first content-addressable memory lookup operation in the second one or more content-addressable memory blocks and the second content-addressable memory lookup operation in the first one or more content-addressable memory blocks are performed overlapping in time.

8. The method of claim 7, comprising:
    selecting among the first and second search keys for said performing said first content-addressable memory lookup operations; and
    selecting among the first and second search keys for said performing the second content-addressable memory lookup operations.

9. The method of claim 8, wherein said selecting among the first and second search keys for said performing said first content-addressable memory lookup operations is performed by a first selector, and said selecting among the first and second search keys for said performing the second content-addressable memory lookup operations is performed by a second selector; and
wherein said determining the first overall highest-priority content-addressable memory lookup result and determining the second overall highest-priority content-addressable memory lookup result is performed by a result determiner.

10. The method of claim 5, wherein the first plurality of content-addressable memory blocks include a first one or more content-addressable memory blocks non-overlapping with a second one or more content-addressable memory blocks;
wherein the first content-addressable memory lookup operation in the first one or more content-addressable memory blocks is performed before the second content-addressable memory lookup operation in the first one or more content-addressable memory blocks; and
wherein the second content-addressable memory lookup operation in the second one or more content-addressable memory blocks is performed before the first content-addressable memory lookup operation in the second one or more content-addressable memory blocks.

11. A method, comprising:
performing a first content-addressable memory lookup operation in each particular content-addressable memory block of a first plurality of content-addressable memory blocks of a content-addressable memory based on a first search key resulting in a plurality of first one or more lookup results including corresponding one or more first lookup results for each said particular content-addressable memory block;
determining a first overall highest-priority content-addressable memory lookup result based on ordering the plurality of one or more first lookup results according to a first priority ordering among the first plurality of content-addressable memory blocks;
performing a second content-addressable memory lookup operation in each specific content-addressable memory block of a second plurality of content-addressable memory blocks of the content-addressable memory based on a second search key resulting in a plurality of second one or more lookup results including corresponding one or more second lookup results for each said specific content-addressable memory block; and
determining a second overall highest-priority content-addressable memory lookup result based on ordering the plurality of one or more second lookup results according to a second priority ordering among the second plurality of content-addressable memory blocks;
wherein the first priority ordering and second priority ordering are different priority orderings among blocks in the content-addressable memory.

12. The method of claim 11, wherein the first and second pluralities of content-addressable memory blocks include at least one overlapping block of the content-addressable memory, and the first and second pluralities of content-addressable memory blocks do not contain the exact same blocks of the content-addressable memory.

13. The method of claim 12, comprising selecting among the first and second search keys for said performing said first content-addressable memory lookup operations and for said performing the second content-addressable memory lookup operations based on a first priority associated with the first search key and a second priority associated with the second search key.

14. The method of claim 11, wherein the first and second pluralities of content-addressable memory blocks include a first overlapping block of the content-addressable memory and a second overlapping block of the content-addressable memory;
wherein the first content-addressable memory lookup operation in the first overlapping block is performed before the second content-addressable memory lookup operation in the first overlapping block; and
wherein the second content-addressable memory lookup operation in the second overlapping block is performed before the first content-addressable memory lookup operation in the second overlapping block.

15. The method of claim 14, wherein the first content-addressable memory lookup operation in the first overlapping block and the second content-addressable memory lookup operation in the second overlapping block are performed overlapping in time; and
wherein the first content-addressable memory lookup operation in the second overlapping block and the second content-addressable memory lookup operation in the first overlapping block are performed overlapping in time.

16. The method of claim 11, comprising selecting among the first and second search keys for said performing said first content-addressable memory lookup operations and for said performing the second content-addressable memory lookup operations based on a first priority associated with the first search key and a second priority associated with the second search key.

17. The method of claim 11, where the first search key is derived based on a header of a first packet and the second search key is derived based on a header of a second packet; and
wherein the method includes processing the first packet based on the first overall highest-priority content-addressable memory lookup result, and processing the second packet based on the second overall highest-priority content-addressable memory lookup result.

18. An apparatus, comprising:
a plurality of content-addressable memory blocks performing a lookup operation based on a search key resulting in a plurality of one or more lookup results including corresponding one or more lookup results for each of the plurality of content-addressable memory blocks; and
a result determiner determining an overall highest-priority content-addressable memory lookup result based on ordering the plurality of one or more lookup results according to a priority ordering among the plurality of content-addressable memory blocks.

19. The apparatus of claim 18, comprising: a profile-based selector retrieving from storage one or more content-addressable memory block priority indications defining the priority ordering among the first plurality of content-addressable memory blocks.

20. The apparatus of claim 18, comprising: one or more entry selectors selecting the search key from a plurality of search keys.

* * * * *